United States Patent Office 2,842,508
Patented July 8, 1958

2,842,508

POLYETHYLENE-WAX COMPOSITIONS AND METHOD FOR PREPARING SAME

Boris J. Sterk, Flushing, N. Y., assignor to Socony Mobil Oil Company, Inc., a corporation of New York No Drawing. Application August 23, 1957
Serial No. 680,011

12 Claims. (Cl. 260—28.5)

This invention has to do with petroleum wax compositions of unusual characteristics. More particularly, the invention has to do with petroleum wax compositions containing small amounts of various polyethylenes.

This application is a continuation-in-part of application Serial No. 481,483, filed January 12, 1955, now abandoned.

As is well known in the art, petroleum wax products such as crude scale wax, refined paraffin wax, petrolatum, microcrystalline waxes and tank bottom waxes have found many uses in the domestic and industrial fields. However, in many cases special properties or properties covering a wider range are needed and the pertoleum wax products are somewhat deficient in meeting such needs. For example, most wax products are deficient in some respects such as tensile strength, flexibility, resistance to blocking, melting point or color. Attempts have been made to improve various of these properties by the addition to wax of one or more of a great many materials such as vegetable waxes, natural resins and gums, esters, amides, fatty acid soaps of heavy metals, and high molecular weight polymers. Yet, while some specific property is improved in all of such compositions, it is usually at the expense of some other property or properties.

In recent years, considerable improvement has been realized by incorporating a polyethylene resin with a petroleum wax. While the polyethylene-petroleum wax compositions have been found to be most unusual and advantageous in domestic and industrial uses, new problems have arisen in connection therewith. By way of illustration, it has been found that storage stability of the polyethylene-petroleum wax compositions is rather poor. That is, when stored in bulk, the polyethylene resin tends to settle out of the petroleum wax composition. Then too, the polyethylene imparts a much greater viscosity to the wax than has the wax when used alone, thereby making more difficult application of the composition. Still another problem posed by the new polyethylene-petroleum wax compositions is the difficulty of bringing the polyethylene resin into solution with the wax. As has been described in the literature and patents during recent years, polyethylene is insoluble or immiscible with most of the well known chemicals and is difficult to put into solution with petroleum wax. There have been a number of disclosures in recent patents of polyethylene-petroleum wax or other wax compositions and many descriptions have been made of attempts to counteract the difficulties mentioned above.

In Patent Number 2,298,846, Skooglund has described wax-polymer blends in which a variety of waxes may be used. Polymers used are those having molecular weights above 15,000 and preferably above 30,000.

Happoldt and Stockfleth have described other ethylene polymer compositions in Patent Number 2,488,799. Here, polyethylene is modified with a relatively small amount of a microcrystalline hydrocarbon wax and a still smaller amount of a metal salt of a long chain organic fatty acid. In this case, the microcrystalline wax comprises from about 2 to about 30% of the total composition and the said metal salt comprises from about 0.1% to about 10%, the balance being a polyethylene.

Fuller has described in Patent Number 2,499,486, films comprising a polyethylene, carnauba wax and di-2-ethyl hexyl phthalate. In these compositions, the polyethylene has a molecular weight of from 18,000 to 22,000.

A method for preparing polyethylene wax compositions is described by MacLaren and Anderson in Patent Number 2,504,270. In this instance, from about 0.001 to about 2% by weight of a polyethylene is brought together with a hydrocarbon wax. The polyethylene or ethylene polymers have average molecular weights of from about 5,000 to about 25,000, with preference given to those ranging from about 10,000 to about 20,000. The petroleum waxes used can be crystalline or paraffin waxes, or microcrystalline or amorphous waxes such as petrolatums. The waxes have melting points ranging from about 125° F. to about 180° F.

Lovell and Straw have described synthetic waxes of the carnauba type in Patent Number 2,523,705. These products are made by reacting from about 19 to about 91 percent by weight of a polyethylene with a hydrocarbon wax. Disclosure is also made of polyethylene used in amounts ranging from about 2 to about 99%.

Laminating cements comprising polyethylene-wax compositions are described by Barnhardt and Miller in Patent Number 2,551,087. In these compositions, the polyethylene has a molecular weight of no less than 15,000 and comprises from about 0.1 to about 10% of the total composition.

A method for blending polyethylene with amorphous petroleum wax is described by Larsen and Schaerer in Patent Number 2,559,645. From about 1.5 to about 30% by weight of a polyethylene having a molecular weight of at least about 10,000, is used in making the compositions described in this patent.

Lovell has described additional synthetic waxes of the carnauba type in Patent Number 2,560,773. Polyethylene in amounts ranging from about 7 to about 35% by weight, is combined with a microcrystalline petroleum wax in making these compositions.

Schneider et al. have described, in Patent Number 2,577,816, a variety of polyethylene-wax compositions. In these compositions the polyethylene has a molecular weight of 20,000. As shown in this patent, polyisobutylene is used to serve as a mutual solvent for the paraffin wax and the polyethylene.

Coating compositions are described by Hyde in Patent Number 2,582,037, the compositions containing polyethylene and wax. In this instance, the polyethylene is used in amounts ranging from about 10 to about 25% by weight, and the polyethylene has an average molecular weight ranging from about 3,000 to about 15,000.

Polyethylene-petroleum wax compositions suitable for use in coating paper milk bottles and the like are shown in Patent Number 2,638,459. In these compositions the polyethylene is one having a molecular weight from about 5,000 to about 25,000. From about 0.001 to about 7% by weight of polyethylene is combined with a petroleum wax.

Coatings suitable for protecting fruit and vegetables are described by Lehman in Patent Number 2,640,040. These compositions comprise from about 50 to about 90% of paraffin, from about 10 to about 50% of refined mineral oil, and from about 0.2 to about 2% of a polyethylene. The latter is one having an average molecular weight from about 3,000 to about 10,000.

More recently, Rumberger has described wax compositions suitable for coating sheet materials in Patent Number 2,642,366. At least 50% by weight of wax is compounded with polyethylene in preparing such compositions, the wax comprising a mixture of microcrystalline wax and paraffin wax. Typical of the polyethylenes used in forming the compositions is one having a molecular weight of 7,000.

Another recent disclosure is that of Irvine in Patent Number 2,556,278. Coatings suitable for covering meat are described. These coatings are prepared from microcrystalline wax and polyethylene, the latter comprising from about 1 to about 10% by weight of the composition. The polyethylene may have molecular weights ranging from about 2,000 to about 30,000. As described in this patent, microcrystalline wax is much more satisfactory than paraffin wax in forming the composition.

Still another recent disclosure is made by Thwaites et al. in Patent Number 2,698,309. Paraffin wax containing a polyethylene and a polyethylene having a terminal hydroxy group, is shown. The polyethylene is one having a molecular weight of 4,000 to 25,000, and the hydroxyl-substituted polyethylene is one having a molecular weight of 500 to 10,000.

In the foreign patent art, there have been several disclosures similar in character to those noted above. For example, in British Patent 642,411, there is a description of compositions comprising from about 0.5 to about 20% by weight of a polyethylene having a molecular weight of at least 6,000. The balance of the composition is a straight chain paraffin having at least 50 carbon atoms per molecule and having a melting point of at least 176° F. Similarly, in British Patent 642,412, related compositions are shown. In the latter a polyethylene of at least 6,000 molecular weight is used in amounts ranging from about 0.5 to about 10% by weight. The balance is a straight chain paraffin having less than 40 carbon atoms per molecule and having a melting point ranging from 131 to 176° F.

This invention is concerned with compositions of the general character referred to in the foregoing prior art patents, but distinguishing from the disclosures of said patents in one or more salient respects. More particularly, the invention is concerned with polyethylene-petroleum wax compositions in which two or more different polyethylenes are used.

It is an object of this invention, therefore, to provide new and novel polyethylene-petroleum wax compositions. Another object of the invention is to provide polyethylene-petroleum wax compositions having improved storage stability characteristics. Another object of the invention is to provide polyethylene-petroleum wax compositions of superior character for coating a variety of base materials.

Still another object of the invention is to provide polyethylene-petroleum wax compositions which have a lower wax consumption than related compositions for coating base materials and in particular paper milk containers. A particular objective is to provide polyethylene-petroleum wax compositions of excellent character for coating milk containers.

Still another object of the invention is to provide an advantageous method for forming compositions of polyethylene and petroleum wax.

Other objects and advantages of this invention will be apparent from the following description.

The compositions of this invention are those which comprise the following:

(a) From about 97 to about 99.5% by weight of a paraffin wax having a melting point from about 120° F. to about 140° F.;

(b) A lower molecular weight polyethylene having an average molecular weight from about 1,000 to about 2,500;

(c) A higher molecular weight polyethylene having an average molecular weight from about 4,000 to about 12,000;

(d) The polyethylene (b) being present in an amount of at least about 0.25 percent by weight, the polyethylene (c) being present in an amount of at least about 0.1 percent by weight, and a total of said (b) and (c) being from about 3 to about 0.5 percent by weight of the said composition.

As indicated, the paraffin waxes used in the compositions of this invention are those having melting points from about 120 to about 140° F. They may contain, in addition to paraffin wax, relatively small amounts of microcrystalline wax. In general, microcrystalline wax will be present in amounts of less than about 15 percent by weight of the total waxes. In addition, it has been noted that the paraffin wax should be relatively free from oil, that is, it should not contain any more than about 2 percent by weight of oil.

The polyethylenes, as indicated, comprise one or more of lower molecular weight materials and one or more of higher molecular weight materials. The molecular weights of such materials are in Staudinger units, being determined by the method described by H. Staudinger in "Die hochmolekularen organischen Verbindungen," published by Springer, Berlin, 1932. Those of lower molecular weight (b) have average molecular weights ranging from about 1,000 to about 2,500. Of such polyethylenes, those having average molecular weights of about 1,500 and about 2,000 have been found to be particularly advantageous. Polyethylenes of this character have previously been suggested for polyethylene-wax coatings, particularly for use in coating paper or paperboard for the formation of paper milk bottles. Among the advantages claimed for such polyethylene-wax coatings are: (1) better gloss on the finished container; (2) less rub-off of wax on clothing; and (3) less flaking of wax into milk. In addition to these visible advantages, the polyethylene-wax blends decrease the consumption of wax on the milk container. However, there are certain disadvantages in the use of these lower molecular weight polyethylenes with petroleum wax. For example, wax blend consumption is still relatively high for the lower molecular weight polyethylene-wax compositions.

The higher molecular weight polyethylenes (c) are those having average molecular weights ranging from about 4,000 to about 12,000. Particularly desirable of such polyethylenes is one having an average molecular weight of about 5,000. These higher molecular weight polyethylenes have not proven satisfactory for the coating of paper and paperboard, such as for use in the aforesaid paper milk containers. They have a great tendency to settle out of the blend at storage temperature. Furthermore, they engender high viscosities of the resulting polyethylene-wax compositions, thus making difficult the application thereof to various base materials, such as paper. And as mentioned earlier, they go into solution with petroleum waxes with greater difficulty than the lower molecular weight polyethylenes. However, one advantage of the higher molecular weight polyethylene over the said lower molecular weight polyethylene in compounding the same with petroleum wax, is a decrease in consumption of wax beyond that of the lower molecular weight polyethylene.

Typical of the lower and higher molecular weight polyethylenes useful in the compositions contemplated herein are the following, molecular weights having been determined by the Staudinger procedure:

| Polyethylene | Average Molecular Weight | Melting Point, °C.[1] | Hardness [2] | Specific Gravity | Viscosity at 140° C. |
|---|---|---|---|---|---|
| A | 1,500 | 88–90 | 2.0–2.5 | 0.92 | 69 Secs. Furol. |
| B | 2,000 | 85–86 | | | 230 Centipoises. |
| C | 2,000 | 97–102 | 0.3–0.5 | 0.92 | 180 Secs. Furol. |
| D | 2,000 | 102–106 | 0.2–0.3 | 0.92 | 250 Secs. Furol. |
| E | 5,000 | 102–104 | 0.3–0.4 | 0.92 | 4,000 Centipoises. |

[1] Melting point by A. S. T. M. D–87 method.
[2] Needle penetration in millimeters (200 grams, 5 seconds, 77° F.).

It has now been found that blends of a lower molecular weight polyethylene (b) with a higher molecular weight polyethylene (c) and with paraffin wax, have the following advantages: increased storage stability over a blend of the higher molecular weight polyethylene (c) and wax; increased ease of blending over blends of (c) and wax; provides a much more satisfactory viscosity than blends of (c) and wax; and provides a much lower blend consumption than either blends of (b) and wax or blends of (c) and wax. In fact, as is demonstrated hereinafter by typical test data, the combination of the lower and higher molecular weight polyethylenes gives a superior performance than either the lower molecular weight polyethylene alone or the higher molecular weight polyethylene alone. The performance is one which cannot be expected from the results obtained by either of the individual polyethylenes used alone. As such, the performance can be properly dignified as a synergistic performance.

As recited above, the total amount of the two types of polyethylenes is from about 0.5 to about 3 percent by weight of the total composition. The lower molecular weight material (b) may be present in an amount as small as about 0.25 percent by weight, and may be present in an amount of as much as about 2.9 percent by weight. Similarly, the minimum and maximum amounts of the higher molecular weight polyethylene (c) are: respectively, about 0.1 and about 2.75 percent by weight. Generally, approximately equal amounts of the lower and higher molecular weight polyethylenes are preferred. And preference is generally given to a total amount of from 1 to 2 percent by weight of the said lower and higher molecular weight polyethylenes. Below about 1 percent concentration, all of the advantages enumerated above for the composition of this invention are not realized. With amounts beyond about 2 percent, an increase in viscosity of the blend is found, thus making the operation less attractive.

A method has been developed for preparing the compositions of this invention, such method being free from the difficulties previously encountered with other polyethylene-petroleum wax compositions. A concentrate containing from about 2 to about 3 parts by weight of paraffin wax and one part by weight of mixed polyethylenes (b) and (c) is prepared in the following manner: The paraffin wax is melted by heating the same to a temperature above its melting point. Thus, a paraffin wax having a melting point of 127° F. is generally heated to about 150° F. Thereafter, the required amount of lower molecular weight polyethylene (b) is added to the melted wax and the temperature is raised to about 200° F., all while stirring the polyethylene (b) and wax. Then, the mixture is maintained at about 200° F. with continued stirring until such time as the lower molecular weight polyethylene (b) is completely dissolved in the wax. This generally requires only a few minutes. The required amount of higher molecular weight polyethylene (c) is then added to the resulting solution, and the temperature is raised gradually to about 220° F. while stirring is continued. The latter temperature is maintained and stirring is continued for a period of time sufficient for the higher molecular weight polyethylene (c) to become completely dissolved in the said lower molecular weight polyethylene (b)-paraffin wax composition. It is to be understood that this method is the preferred one for forming the concentrates of this invention. Thereafter, blends can be prepared by mixing suitable quantities of additional paraffin wax, maintained above about 145° F., with a concentrate maintained at a temperature above about 200° F. As a guide, when a concentrate containing about 2 parts by weight of wax to one part by weight of polyethylene is used, the temperature of the additional wax, with which the concentrate is mixed, should be at least about 150° F. When a wax:polyethylene concentrate of about 3:1 is used, the temperature of the additional wax can be as low as about 145° F.

Continuing in the same vein, base materials such as paper and paperboard, and particularly the paperboard used for milk containers can be coated with the compositions of this invention by any of the well known procedures available in the art. By way of illustration, in gathering the data shown hereinafter, samples of paperboard were dipped at 175° F. in a wax-polyethylene blend of this invention for ten seconds, drained for five seconds, and were set up by immersion in water at 70° F. In this way, a film of polyethylene-wax was formed on the paperboard.

The superiority of the blended polyethylene-wax compositions of this invention is demonstrated by consumption figures for polyethylene-paraffin wax blends. The superiority of compositions of the type contemplated herein, over compositions containing a polyethylene and a hydroxyl-substituted polyethylene, is also demonstrated. That is, the amount of blend consumed by paperboard is an indication of the relative efficiency of the individual compositions used. The paperboard selected was one conventionally used in making milk containers for the dairy industry. It has a porosity of 275 seconds, measured on a Gurley Densometer. The operating conditions for preparing the wax coated strip of paperboard approximate operating conditions in plants making such milk containers. More specifically, samples of paperboard (3″ x 6″ in size) were dipped in a polyethylene-paraffin wax blend maintained at 175° F. The paperboard was so dipped in the blend for about ten seconds, then was drained for five seconds, and was finally set up by immersion in water maintained at 70° F. The samples were weighed before and after coating and the consumption was figured as percent by weight of blend based on the original weight of the paperboard strip. The results are those shown in Table 1 following.

*Table I*

| Blend | Percent Weight Coating Material Picked Up | Relative Consumption of Coating Material, Percent |
|---|---|---|
| (1) Straight wax 127° F. AMP | 43.8 | 100.0 |
| (2) No. (1) plus 2% Polyethylene 2,000 M. W.-B above | 41.6 | 95.9 |
| (3) No. (1) plus 2% Polyethylene 5,000 M. W.-B above | 41.0 | 93.2 |
| (4) No. (1) plus 1% Polyethylene 2,000 M. W.-B above and 1% Polyethylene 5,000 M. W.-E above | 39.3 | 89.5 |
| (5) No. (1) plus 0.5% Polyethylene 2,000 M. W.-B above plus 0.5% Polyethylene 5,000 M. W.-E above | 37.1 | 84.7 |
| (6) No. (1) plus 0.75% Polyethylene 2,000-B above and 0.75% Polyethylene 5,000-E above | 37.8 | 86.4 |
| (7) Straight wax 127° F. AMP | 40.5 | 100 |
| (8) No. (7) plus 2% Alcowax 7 [1] | 58.2 | 143.5 |
| (9) No. (7) plus 2% Polyethylene 5,000 M. W.-B above | 38.4 | 94.8 |
| (10) No. (7) plus 1% Alcowax 7 [1] plus 1% Polyethylene 5,000 M. W.-B above | 37.4 | 92.5 |
| (11) No. (7) plus ½% Alcowax 7 [1] plus ½% Polyethylene 5,000 M. W.-B above | 36.9 | 91.1 |
| (12) No. (7) plus ¾% Alcowax 7 [1] plus ¾% Polyethylene 5,000 M. W.-B above | 36.8 | 90.9 |

[1] 2,000 molecular weight polyethylene having a terminal hydroxyl group.

From the results set out in Table I, it will be observed that the combination of the lower and higher molecular weight polyethylenes provides performances superior to either that of the lower molecular weight polyethylene alone or to the higher molecular weight polyethylene alone. Comparing the results of Examples 1, 2, 3 and 4, it is seen that the amount of material picked up in Example 4 is unexpectedly less than in either Examples 2 or 3. Thus Example 4 evidences synergistic behavior. It should be noted that in Example 5, the total weight of polyethylene is about 1% of the total of the composition, in contrast to the 2% by weight of polyethylene used in Examples 2, 3 and 4. Correspondingly, the total weight of polyethylene in Example 6 is about 1.5% of the composition. Even though substantially lower quantities of polyethylenes are used in Examples 5 and 6, the results are superior to those of Examples 2 and 3.

With regard to Examples 1 through 6, when compared with Examples 7 through 12, it will be evident that superior results are obtained without resort to the use of a polyethylene modified by the presence of a hydroxyl group.

It is to be understood that the compositions of this invention can contain small amounts of antioxidants of the character generally used in petroleum waxes. Sustane (a tertiary butylated hydroxanisole) and 2,6 di-tertiary butyl-4-methyl-phenol are illustrative of such antioxidants.

I claim:

1. A composition of matter comprising: (a) from about 97 to about 99.5 percent by weight of paraffin wax having a melting point from about 120° F. to about 140° F.; (b) a lower molecular weight polyethylene having an average molecular weight from about 1000 to about 2500; (c) a higher molecular weight polyethylene having an average molecular weight from about 4000 to about 12,000; (d) polyethylene (b) being present in an amount of at least about 0.25 percent by weight, polyethylene (c) being present in an amount of at least about 0.1 percent by weight and the total of said (b) and (c) being from about 3 to about 0.5 percent by weight of the said composition.

2. The composition of claim 1 wherein the paraffin wax (a) is one having a melting point of about 127° F.

3. The composition of claim 1 wherein the paraffin wax contains microcrystalline wax in an amount up to about 15 percent by weight of the said paraffin wax.

4. The composition of claim 1 wherein the paraffin wax contains oil in an amount of not more than about 2 percent by weight of the said paraffin wax.

5. The composition of claim 1 wherein the polyethylene (b) is one having an average molecular weight of about 2000.

6. The composition of claim 1 wherein the polyethylene (c) is one having an average molecular weight of about 5000.

7. A sheet material for milk bottles comprising a paperboard having a superficial film thereon of the polyethylene-wax composition as defined by claim 1.

8. A coated sheet material comprising a base sheet and a superficial film of the polyethylene-wax composition as defined by claim 1.

9. A composition of matter comprising: (a) about 99 percent by weight of a paraffin wax having a melting point of about 127° F.; (b) about 0.5 percent by weight of polyethylene having an average molecular weight of about 2000; and (c) about 0.5 percent by weight of polyethylene having an average melocular weight of about 5000.

10. A composition of matter comprising (a) about 98.5 percent by weight of a paraffin wax having a melting point of about 127° F., (b) about 0.75 percent by weight of polyethylene having an average molecular weight of about 2000; and (c) about 0.75 percent by weight of polyethylene having an average molecular weight of about 5000.

11. The method for preparing a polyethylene-paraffin wax concentrate, comprising: melting paraffin wax (A) having a melting point from about 120° F. to about 140° F.; adding to said paraffin wax a quantity (1) of a lower molecular weight polyethylene (B) having an average molecular weight from about 1000 to about 2500, and agitating and heating the resulting mixture to about 200° F. until the said polyethylene (B) is dissolved in said wax (A); adding to the polyethylene (B)-wax (A) solution, a quantity (2) of a higher molecular weight polyethylene (C) having an average molecular weight from about 4000 to about 12,000, and agitating and heating the thus formed mixture of wax (A)-polyethylene (B)-polyethylene (C) to about 220° F. until a uniform solution is formed; quantity (1) and quantity (2) being such that their total provides about one part by weight of mixed polyethylenes (B) and (C) to from about two to about three parts by weight of wax (A), and the weight ratio between quantity (1) and quantity (2) being from about 1:9 to about 2.9:1.

12. The method for preparing a polyethylene-paraffin wax composition comprising: blending the polyethylene-paraffin wax concentrate of claim 11, maintained at a temperature above about 200° F., with a quantity of additional paraffin wax, maintained at a temperature of at least about 150° F., sufficient to provide a composition containing from about 0.5 to about 3 percent by weight of said mixed polyethylenes.

References Cited in the file of this patent

UNITED STATES PATENTS 2,698,309     Thwaites et al. _____ Dec. 28, 1954